United States Patent [19]

Lin

[11] Patent Number: 5,782,166
[45] Date of Patent: Jul. 21, 1998

[54] STRUCTURE OF GRILLING APPARATUS

[76] Inventor: Charlotte Lin, P.O. Box 55-175, Taichung, Taiwan

[21] Appl. No.: 805,697

[22] Filed: Feb. 25, 1997

[51] Int. Cl.[6] .................... A47J 37/00; A47J 37/07
[52] U.S. Cl. .................... 99/340; 99/400; 99/401; 99/446; 99/447; 126/9 R; 126/25 R; 126/41 R
[58] Field of Search .................... 99/339, 340, 385, 99/400, 401, 444–450, 481, 482; 126/25 R, 9 R, 9 A, 38, 9 B, 39 M, 337 R, 340, 41 R

[56] References Cited

U.S. PATENT DOCUMENTS

| | | | |
|---|---|---|---|
| 3,552,302 | 1/1971 | Gilberg | 99/444 |
| 3,568,590 | 3/1971 | Grice | 99/446 |
| 3,717,083 | 2/1973 | Karapetian | 99/450 |
| 3,933,144 | 1/1976 | Bandy | 126/25 R |
| 4,862,792 | 9/1989 | Lerma, Jr. | 99/401 |
| 4,930,491 | 6/1990 | Purello | 126/9 R |
| 5,165,385 | 11/1992 | Doolittle et al. | 126/25 R |
| 5,188,089 | 2/1993 | Hamilton | 99/449 X |
| 5,265,586 | 11/1993 | Salerno | 126/41 R |
| 5,293,859 | 3/1994 | Lisker | 99/449 X |
| 5,471,916 | 12/1995 | Bird et al. | 99/446 |
| 5,566,607 | 10/1996 | Schleimer | 99/400 X |
| 5,582,094 | 12/1996 | Peterson et al. | 99/450 X |

Primary Examiner—Timothy F. Simone

[57] ABSTRACT

A grilling apparatus comprises a firebox of a rectangular upper section and a tapered lower section supported on a movable stand and defined by four side walls, a narrow bottom portion and an upper opening, a gas stove on the bottom communicated to an outer switch, a broiler pan of arcuate section releasably disposed adjacent the upper opening, a heat plate secured between the broiler pan and the gas stove for transmitting heat to the broiler pan from the gas stove, a grid for receiving broilers releasably disposed to the upper opening above the broiler pan, a container for containing fresh water selectively disposed between the grid and the broiler pan, a lid including a plurality of louver vents and a handle hinged to one side of the upper opening for closing the firebox and a pair of stations at two ends of the firebox. So that the grilling apparatus of the present invention can grill broilers or selectively steam food stuff.

1 Claim, 3 Drawing Sheets ing apparatus of a prior art, grease draining into the oil collection trays 151

STRUCTURE OF GRILLING APPARATUS

BACKGROUND OF THE INVENTION

The present invention relates to grilling apparatus and more particularly to a structurally improved grilling apparatus which is versatile for capable of safely roasting, baking and steaming meat or food stuff without accumulating grease or unsanitary materials.

Typical grilling apparatus (as shown in FIG. 1) comprises a firebox 1 defined by four side walls and a bottom portion, a broiler pan 2 disposed to the upper opening of the firebox 1, a heat plate 3 disposed between the broiler pan and a gas stove 4 at the center of the bottom portion, a grid 5 disposed on the broiler pan 2 on which the broilers are disposed, a lid 8 including smoke exhaust apertures 9 therein covering the top of the firebox 1, wherein the broiler pan 2 has a rectangular body of a roughly V-shaped section which includes a pair of inwardly inclined surfaces to define a sloped groove 7 therebetween communicating to a pipe 6 which is adapted to drain off the grease from the firebox 1. However, this type of grilling apparatus has at least the following disadvantages: a) the residual grease could not totally drained off but remained in the groove 7 may catch fire if sparks occurs in the firebox 1, b) the size of the heat plate 3 is too small relative to the broiler pan 2 such that the broiler pan 2 can not be evenly heated to averagely grill a broiler, c) when the smoke exhaust apertures exhaust the smoke off, it also release a considerable heat from the firebox so as to reduce the grilling efficiency of the grilling apparatus, d) there is no any structure provided in this grilling apparatus for steaming food stuff.

SUMMARY OF THE PRESENT INVENTION

The present invention has a main object to provide a structure of grilling apparatus which includes a smooth grease drain device in corporation with a pair of oil collection trays so as to prevent any grease from retaining in the broiler pan in order to obviate catching fire in the firebox.

Another object of the present invention is to provide a structure of grilling apparatus which has a heat plate of a size larger enough to cope with that of the broiler pan so as to evenly radiat the heat on the grilling pan which provides average heat to the broiler on the grid.

Still another object of the present invention is to provide a structure of grilling apparatus in which a water container is provided to facilitate steaming food stuff.

Further object of the present invention is to provide a structure of grilling apparatus in which a plurality of louver vent are provide to indirectly lead in the fresh air and exhaust out the smoke so as to protect the heat from expelling out of the firebox.

The present invention will become more fully understood by reference to the following detailed description thereof when read in conjunction with the attached drawings.

DETAILED DESCRIPTION OF THE PREFERRED EMBODIMENT

Figure 1:
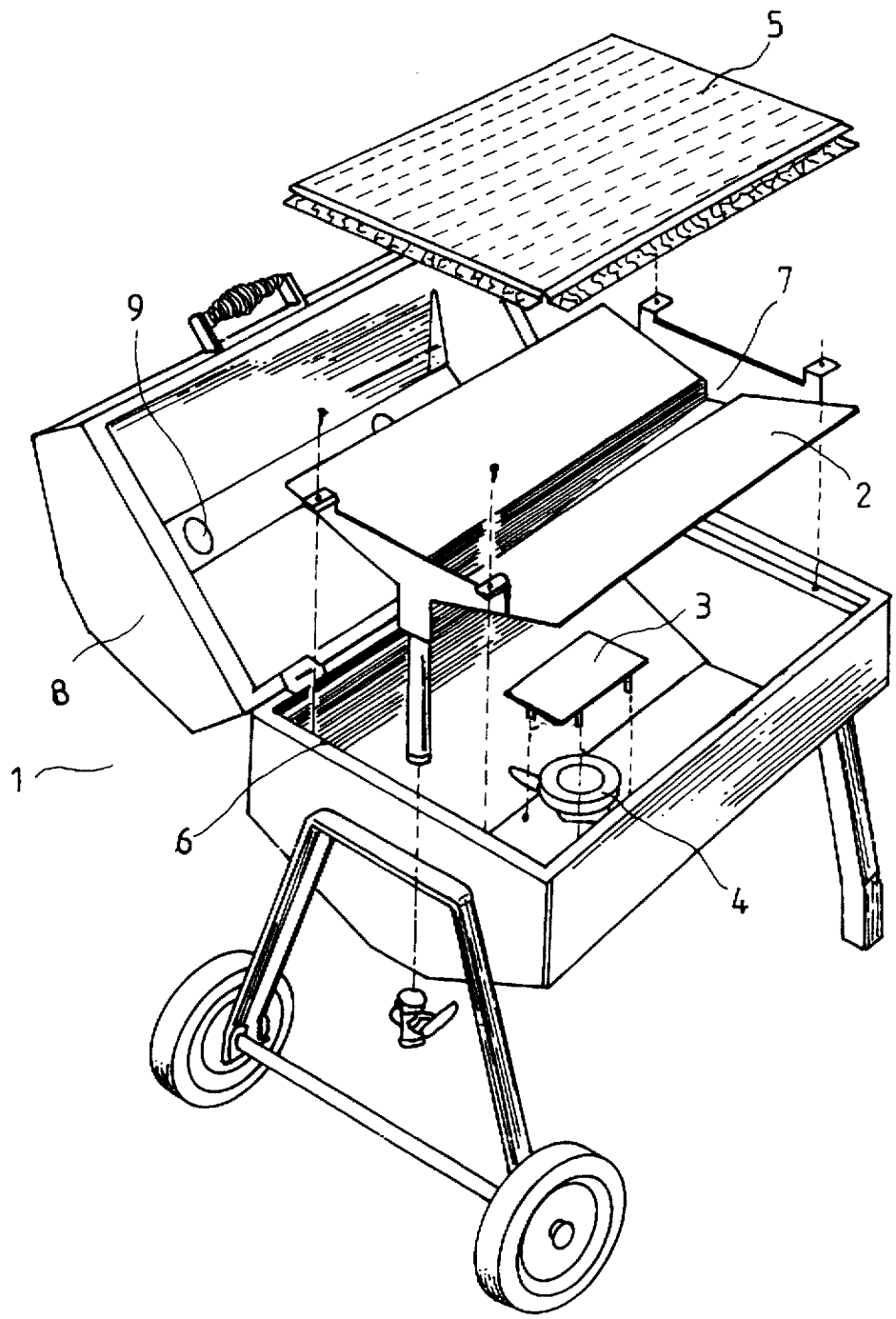
FIG. 1 is an exploded perspective view to show a grilling apparatus of a prior art.
Figure 2:
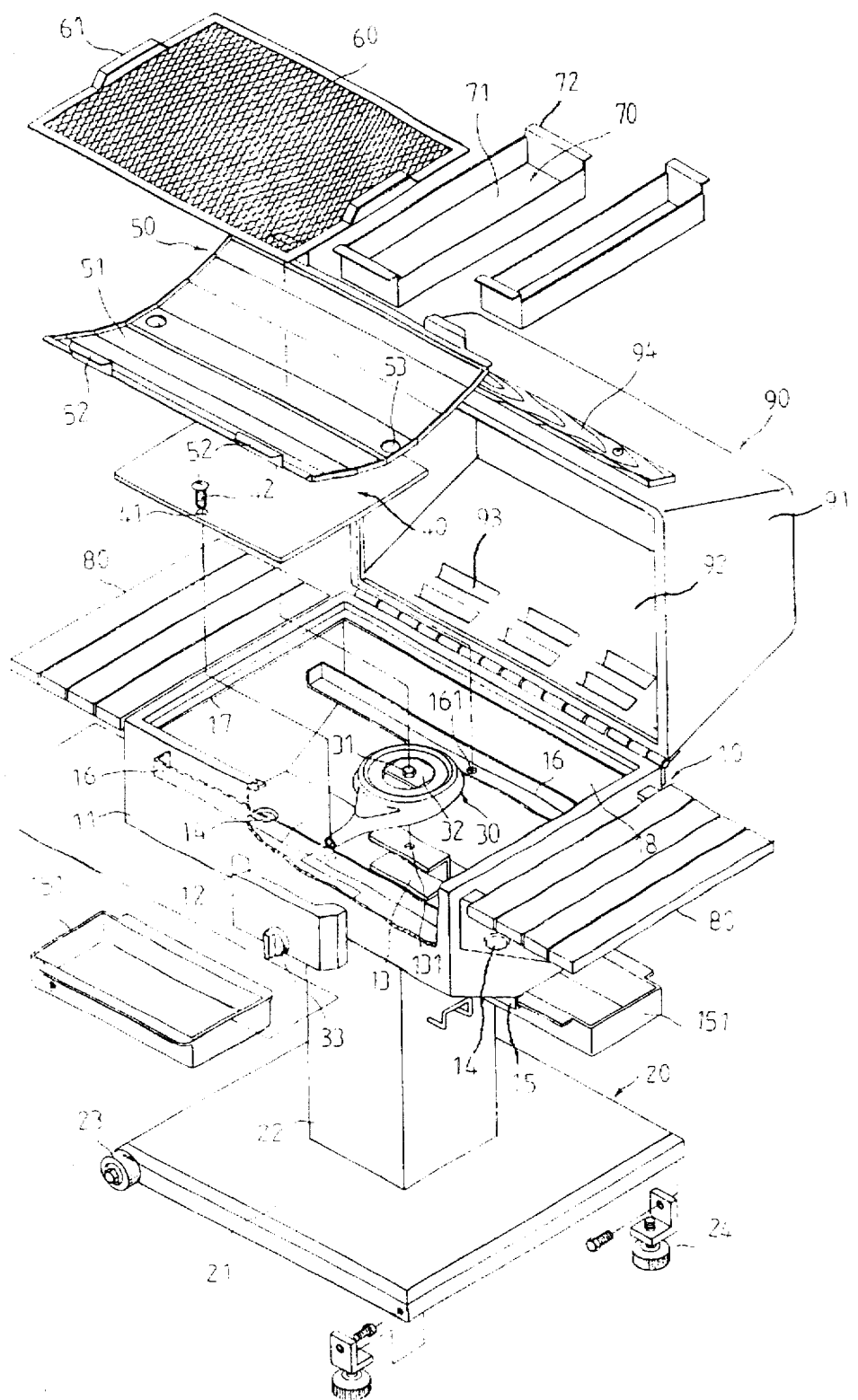
FIG. 2 is an exploded perspective view to show a preferred embodiment of the present invention.
Figure 3:
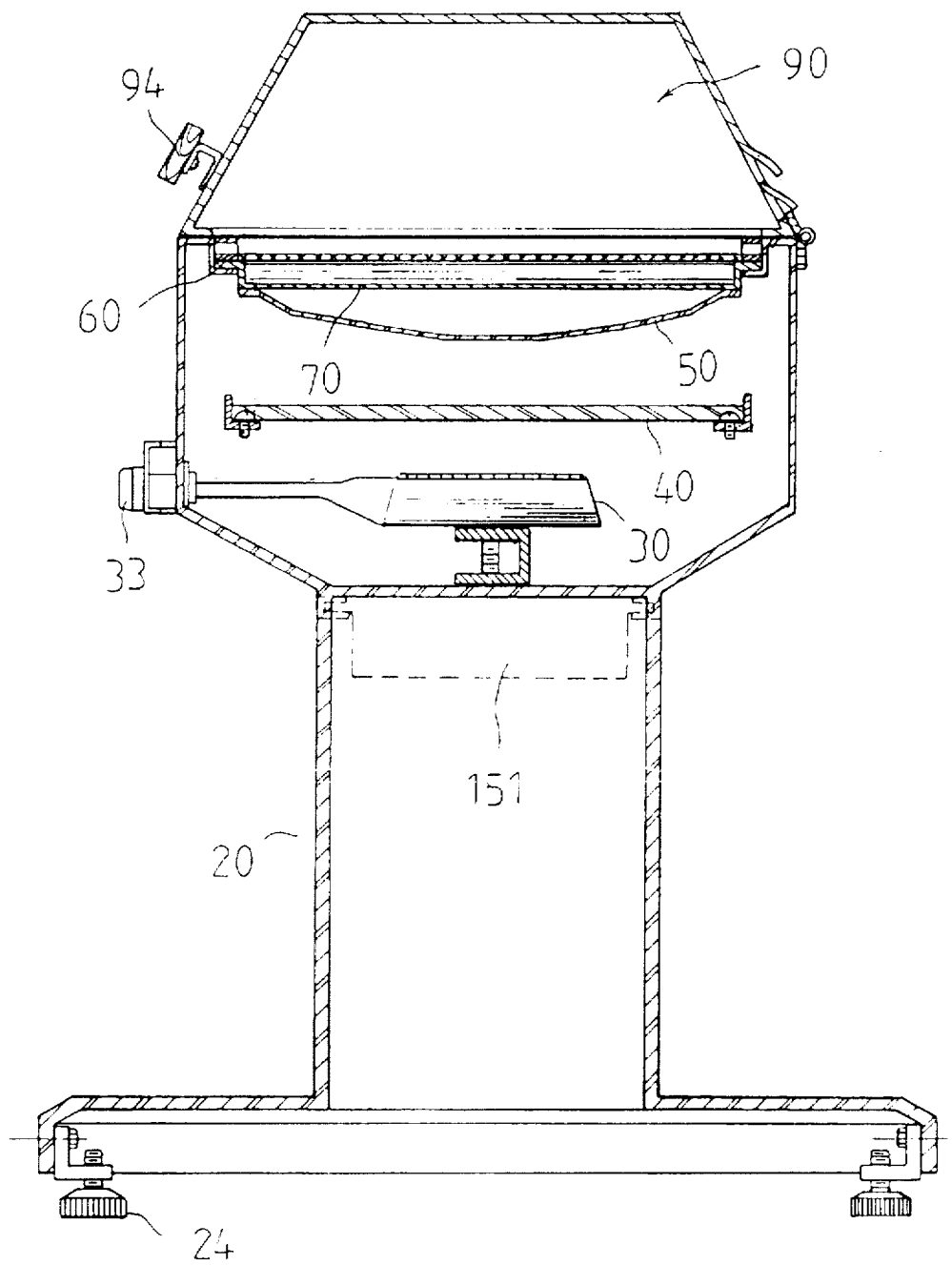
FIG. 3 is a sectional view to show an assemblage of grilling apparatus of FIG. 2.

With reference to FIGS. 2 and 3, the grilling apparatus of the present invention comprises generally a firebox 10 integrated with a stand 20. The firebox 10 of a rectangular upper section and a tapered lower section is defined by four side walls 11, a narrow bottom portion 12 and an upper opening 18. A support 13 of a roughly U-shaped section centrally projects upward from the bottom portion 12 including a first central bore 131 for securing a gas stove 30 thereon by means of a bolt 31 and a washer 32. A switch 33 at a middle outer surface of a side wall 11 connected to the inlet of the gas stove 30 for operating the stove 30 which has a second central bore engageable with the first central bore of the support 13. A pair of first apertures 14 formed in the proximity of two ends of the bottom portion 12 communicating with a pair of guide slots 15 beneath two ends of the bottom portion 12 for slidably engaging in a pair of oil collection trays 151. A pair of elongate slots 16 extend longitudinally along the length of an inner surface of a pair of opposing side walls 11 each has a first screw hole 161 at appropriate middle portion for engaging with a heat plate 40 which has a metallic square flat body horizontally disposed to the pair of the elongate slots 16 including a pair of second screw holes 41 adjacent a pair of opposing sides engageable with the first screw hole 161 and secured by a pair of bolts 42. An encirclement flange 17 extends inward from the inner surface of the four side walls 11 adjacent the upper opening 18 of the firebox 10 for releasably engaging a rectangular broiler pan 50 of an arcuate section which is connected with a plurality of parallel elongate metal plates 51 has a pair of roughly L-shaped retaining tabs 52 spacedly projected upward from the outer edge of each of two outmost elongate rectangular plates 51 for engaging with the encirclement flange 17 and a pair of second apertures 53 adjacent two ends of a middle elongate rectangular plate 51 made in alignment with the pair of the first apertures 14 for facilitating the grease draining into the oil collection trays 151 from the broiler pan. A grid 60 on which the broilers are disposed, has a size equal to that of the broiler pan 50 so as to releasably disposed to the opening of said firebox on the broiler pan 50 and a pair of ears 61 projected upward from two ends for facilitating picking up the grid 60 from the broiler pan 50. A centainer 70 has a cubic rectangular body, an upper opening 71 and a pair of flanges 72 extended outward from two ends of the opening 71 engageable with the encirclement flange 17. The container 70 contains water and is optionally used to steam food stuff. A pair of stations 80 extended outward from two ends of the firebox respectively for disposing broilers and seasonings. A lid 90 hingedly engaged with one side of the upper opening 18 of the firebox 10 and biased by spring means. The lid 90 has a hollow tapered body 91, a lower opening 92 sizeably equal to the opening 18 so as to closely cover the firebox 10, a plurality of louver vents 93 formed spaced apart in one of the lateral housing for introducing the fresh air into and exhausting the smoke out of the firebox 10 and a handle 94 attaches to an outer surface of an opposing lateral housing thereof for opening and closing the lid 90 from the firebox 10. The louver vents 93 have an advantage to prevent the heat from directly expelling out but circulating in the firebox 10 so as to enhance the grilling capability in the firebox 10.

The stand has a square base 21, a hollow rectangular upright 22 centrally projected upward from the upper surface of the base 21 and axially connected on upper end to the bottom of the firebox 10, a pair of casters 23 pivotally connected spaced apart to one side of the base 21 for moving the firebox 10 and a pair of glides 24 rotatably connected spaced apart to other side of the base 21 opposite to the casters 23 for adjusting the horizontal of the firebox 10. FIG. 3 shows a well assembled grilling apparatus of the present invention.

In operation, the grilling apparatus is normally used to roast or to bake broilers. When optionally uses the firebox 10 to steam food stuff, the container 70 contained with water is adapted to disposed between the grid 60 and the broiler pan 50 such that the steam yield from the boiled water can effectively steam the food stuff disposed on the grid 60. The grease dripped from the broilers to the arcuate surface of the broiler pan 50 will be immediately lead to the second apertures 53 and trained off into the oil collection trays 151 through the first apertures 14 in the bottom portion 12 of the firebox 10. The louver vents 93 will effectively introduce the fresh air into and prevent the mostly the heat from leaking out of the firebox 10.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:
1. An apparatus for grilling broilers comprising:
a firebox of a rectangular upper section and a tapered lower section defined by four side walls, including an upper opening and a narrow bottom portion;

a support of roughly U-shaped section centrally projected from the bottom portion including a first central bore in upper portion;

a gas stove disposed to the support and secured to the first central bore by means of a bolt and a washer, said gas stove including a second central bore in a center thereof engageable with first central bore and an inlet communicating to a switch means at a middle outward surface of one of the side walls of said firebox;

a pair of first apertures formed in the proximity of two ends of the bottom portion;

a pair of guide slots formed beneath two ends of the bottom portion communicating to the first apertures respectively;

a pair of oil collection trays slidably engaged into the respective guide slots for collecting grease from the first apertures;

a pair of elongate slots extended along the length of inner surface of a pair of opposing side walls of said firebox each including a first screw hole in an approriate middle portion thereof;

a heat plate of a metallic square flat body horizontally disposed to the pair of elongate slots including a pair of second screw holes engageable with the first screw holes and secured by means of bolts;

an encirclement flange extended inward from inner surface of the four side walls of said firebox;

a rectangular broiler pan of arcuate section releasably disposed on the encirclement flange, said broiler pan being composed of plurality of parallel connected elongate rectangular plate, a pair of roughly L-shaped retaining tabs projected upward from an outward edge of each of two outmost elongate plates engageable with the encirclement flange and a pair of second apertures adjacent two ends of a middle elongate plate thereof made in alignment with the first aperture in the bottom portion of said box for draining off the grease from said broiler pan into said oil collection trays;

a rectangular grid releasably disposed to the opening of said firebox above said broiler pan including a pair of ears centrally projected upward from two ends thereof;

a container selectively disposed between said grid and said broiler pan, said container composed of a cubic rectangular body for containing fresh water therein, an upper opening and a pair of flanges extended outward from two ends of the upper opening engageable with the encirclement flange;

a pair of station members extended outward from two ends of the upper opening of said firebox respectively;

a lid hinged to one side of the upper opening of said firebox for closing said firebox, said lid comprising a hollow tapered body, a lower opening engageable with the upper opening of said firebox, a plurality of louver vents formed spaced apart in one lateral housing for introducing fresh air into and exhausting smoke out of said firebox, and a handle attached to an outer surface of an opposing lateral housing thereof;

a stand for supporting said firebox including a square flat base, a rectangular upright centrally projected upward from the base and axially connected on upper end to a bottom of said firebox, a pair of casters pivotally connected spaced apart to one side of the base and a pair of glides rotatably connected spaced apart to an opposing side of said base;

whereby said firebox is moveable and horizontally adjustable for selectively grilling broilers and steaming food stuff.

* * * * *